United States Patent [19]
Patel

[11] 3,810,111
[45] May 7, 1974

[54] DATA CODING WITH STABLE BASE LINE FOR RECORDING AND TRANSMITTING BINARY DATA

[75] Inventor: Arvind M. Patel, Wappingers Falls, N.Y.

[73] Assignee: International Business Machines Corporation, Armonk, N.Y.

[22] Filed: Dec. 26, 1972

[21] Appl. No.: 317,980

[52] U.S. Cl. 340/172.5, 340/174.1 G, 340/347 DD, 178/68, 340/146.1 AB

[51] Int. Cl. ...... H03k 13/00, H041 3/00, G06f 5/00

[58] Field of Search...............340/172.5, 146.1 AB, 340/174.1 G, 340/347 DD; 178/66, 67, 68

[56] References Cited

UNITED STATES PATENTS

| | | | |
|---|---|---|---|
| 3,226,685 | 12/1965 | Potter et al. | 340/172.5 |
| 3,374,475 | 3/1968 | Gabor | 340/174.1 |
| 3,414,894 | 12/1968 | Jacoby | 340/174.1 |
| 3,452,348 | 6/1969 | Vallee | 340/347 |
| 3,618,044 | 11/1971 | Cupp | 340/172.5 |
| 3,623,041 | 11/1971 | MacDougall | 340/174.1 G |
| 3,631,463 | 12/1971 | Murphy | 340/347 DD |

*Primary Examiner*—Paul J. Henon
*Assistant Examiner*—James D. Thomas
*Attorney, Agent, or Firm*—W. S. Robertson

[57] ABSTRACT

An improved method and apparatus for encoding and decoding binary data is disclosed. For improving data density for storage or transmission, the waveform has an upper frequency limit such that transitions in the encoded waveform occur no closer together than the time for one data digit. To provide suitable clocking for waveform detection circuits, the waveform has a lower frequency limit that transitions occur no farther apart than two data digit times. In addition, the waveform is symetrical about a zero signal level within narrow limits. The encoding is called "zero modulation" (or ZM) for zero direct component. Since the waveform has a constrained direct component, it can be used with circuit devices of the type that will not transmit a direct component. Circuits for detecting errors in the decoded waveform are also disclosed.

20 Claims, 11 Drawing Figures

DECODER

FIG. 5

| CHARGE S | ENDING WAVE FORM 01 | 10 | 01 00 | 10 00 |
|---|---|---|---|---|
| +2 | X | A | A' | D |
| 0 | Y | B | C | N(3) |
| -2 | Z | N(1) | N(2) | N(4) |
| ≥ 4<br>≤ (-4) | S(4) | | | |

FIG. 6

| PREVIOUS STATE | PRESENT STATE WHEN $a_0 b_0 = 01$ | $a_0 b_0 = 10$ | $a_0 b_0 = 00$ |
|---|---|---|---|
| X | Z | – | S(4) |
| Y | Y | – | A' |
| Z | X | – | C |
| A | Z | B | S(4) |
| B | Y | A | D |
| A' | Z | B | – |
| C | Y | A | – |
| D | – | B | – |
| N(1) | X | S(4) | N(3) |
| N(2) | X | S(4) | – |
| N(3) | – | A | – |
| N(4) | – | S(4) | – |

DATA CODING WITH STABLE BASE LINE FOR RECORDING AND TRANSMITTING BINARY DATA

SUMMARY OF THE INVENTION

The data representation arrangement used in familiar logic circuits provides a convenient starting point for discussing data encoding. In logic circuits it is common to represent a binary 1 digit by a predetermined positive voltage level and a 0 digit by a zero level voltage. For data transmitting or data recording operations of the type to which this invention relates, encoding circuits are provided that modify this simple arrangement. For example, in an encoding arrangement called "non-return to zero" (NRZI), a 1 digit is represented by a transition between two signal levels and a 0 digit is represented by the absence of a transition. One object of this invention is to provide a new and improved method and apparatus for encoding data digits into NRZI waveform digits. Another object of this invention is to provide an upper limit on the frequency of the data representing waveform to provide further recording or transmitting density. All data handling devices have a practical upper frequency limit, and the number of transitions that are required to represent a data bit is a limit on data density.

Logic circuits commonly have clock signals that identify a succession of digit times and thereby distinguish digits that are represented by an unvarying voltage level. For example, a positive voltage extending over three digit time intervals would be recognized as three digits, 111, rather than as a single digit.

For some recording and data transmission applications the data waveform itself is arranged to provide clocking signals. For example, the NRZI waveform of a succession of 1 digits would have regularly spaced waveform transitions that identify the digit times and these transitions can be used for synchronizing a clock at the data decoder. When the data contains a mixture of 1 and 0 digits, the clock can be synchronized when a 1 occurs in the data pattern and the clock can run freely during the 0 digit times in approximate synchronization with the waveform. However, a longer sequence of 0 digits may allow the clock to lose synchronism with the data so that the waveform cannot be decoded. An object of this invention is to provide an encoder that produces a suitable clock signal. Specifically, an object of this invention is to provide an encoder that produces a clocking transition in at least one of every two adjacent digit periods.

The logic circuit waveform that has been described contains a direct voltage component that varies between zero voltage and the voltage that represents a logical 1. There are low frequency limits in transmitting such a waveform through capacitive or inductive coupling circuits or through the magnetic field of a magnetic recording device. For example, when a series of positive pulses are transmitted through a capacitive coupling circuit, the charge on the capacitor accumulates with the direct voltage component of the waveform and the output pulses gradually degenerate. In this specification, the term "charge" will be used to describe both the charging of a capacitor in this way or the analogous increase of voltage or current in an inductive circuit. One object of this invention is to provide a new and improved encoder that limits the charge accumulation to a low value. More specifically, an object of this invention is to limit the charge accumulation to a maximum of plus or minus three charge units (where a "charge unit" is one half the charge that is accumulated during a single digit interval by an unvarying waveform).

The objects of this invention have been considered contradictory in coding circuits of the known prior art. A more specific object of this invention is to provide a new and improved coding circuit that achieves each of these objects. According to this invention, each data digit is encoded as a pair of binary digits and the binary digit pair is converted to an NRZI waveform. The data digits 1 and 0 are encoded as digit pairs 01, 10, and 00. To limit the frequency that is required for the waveform, the waveform digit pair 11 is not used and the digit pair 01 is never followed by the digit pair 10. To limit the lowest frequency of the waveform in order to provide satisfactory clocking, the waveform digits 00 are never followed by a second 00, and the successive waveform digit pairs 10, 00 are never followed by 01. Thus, there are never four successive 0 digits in the encoded waveform and a transition that permits clocking occurs in at least one of every two adjacent digit periods. Thus, the coding circuits achieve the upper and lower frequency constraints that have been discussed as objects of this invention.

In order to meet the frequency constraints described as an object of this invention, some waveform digit pairs are used to represent both 1 and 0 data digits. The selection of a particular digit pair to represent a data digit depends on the data digit, the preceding data digit, and the preceding waveform digit pair. For achieving the charge constraint described in the preceding paragraphs, the choice of a waveform digit pair is further made to depend on the existing charge state and the sequence of data digits that is to be encoded next. This choice is arranged so that a sequence of data digits will not produce more than three charge units.

The following description of two preferred embodiments of the invention continues this summary of the invention with a more specific description of the waveforms and logic operations performed and with a more generalized theoretical explanation of the encoder and decoder of this invention.

THE DRAWING

FIG. 5 is a table showing the charge state for various sequences of encoded waveform digit pairs.

FIG. 6 is a table showing transitions from one state to another in the table of FIG. 5.

DETAILED DESCRIPTION OF THE DRAWING

I — Introduction

Figure 2:
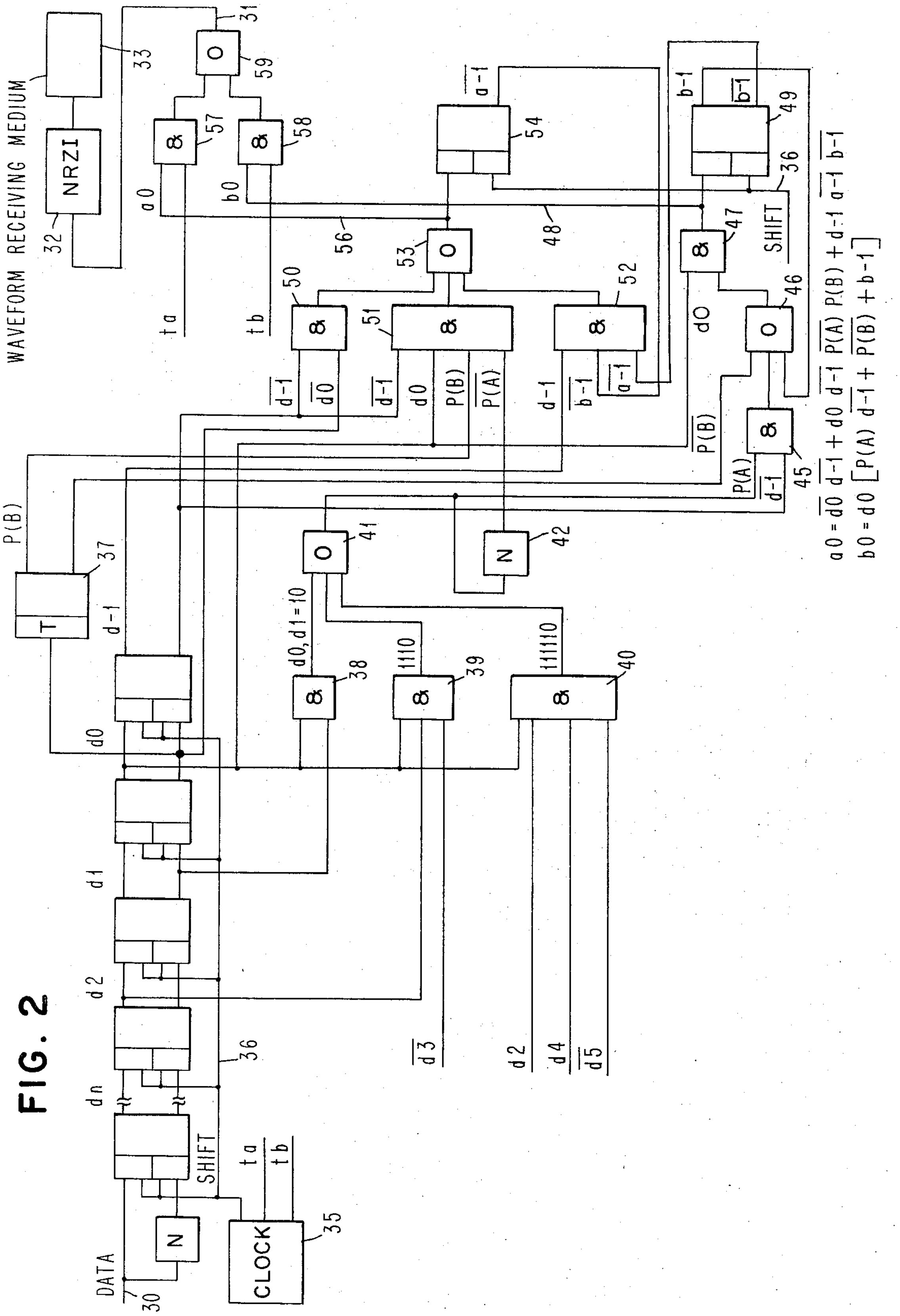
FIG. 2 is a logic diagram of the encoder of this invention having infinite storage capacity.
Figure 3:
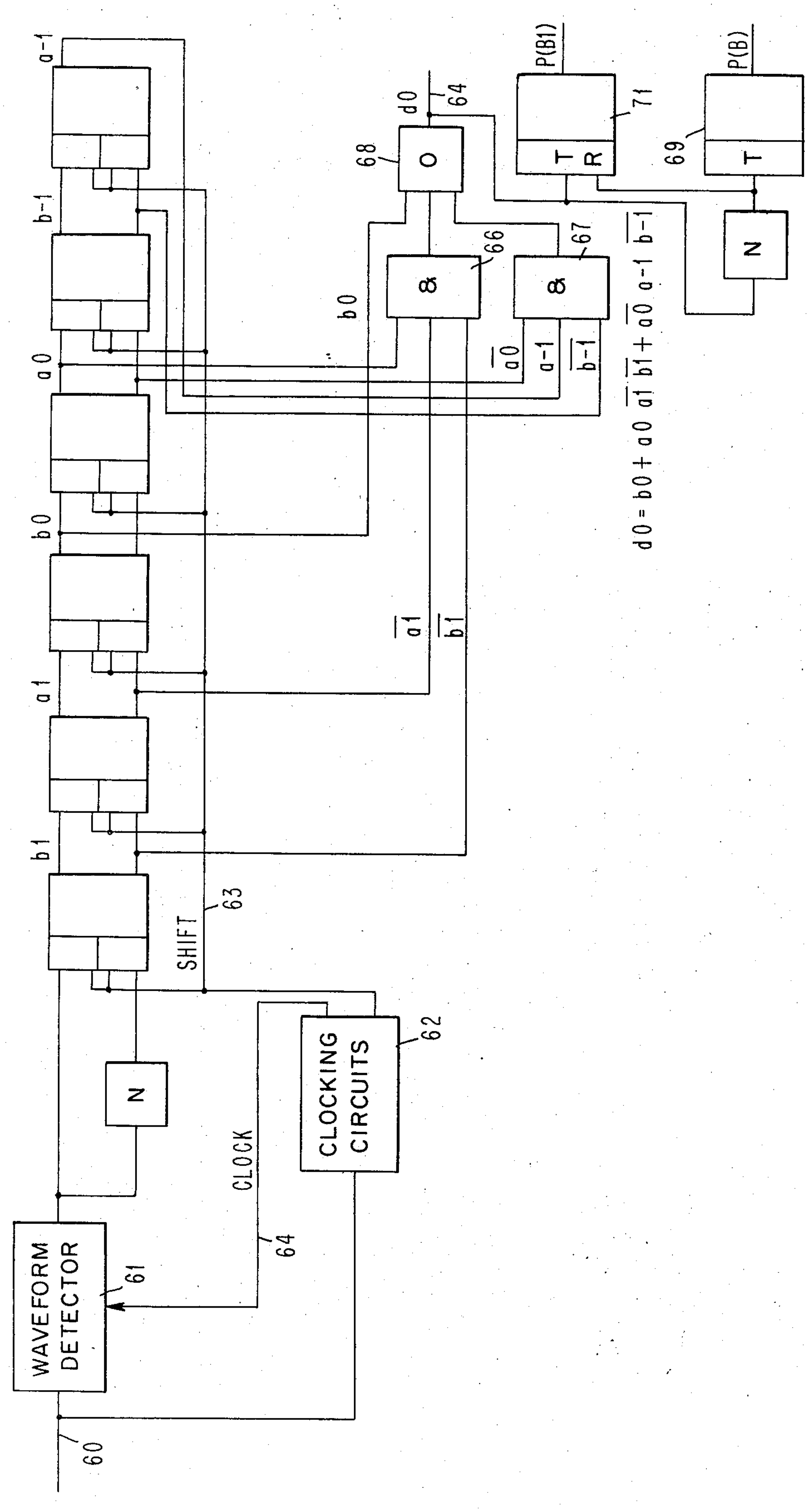
FIG. 3 is a logic diagram of a decoder for decoding a waveform encoded by the circuit of FIG. 2.
Figure 4:
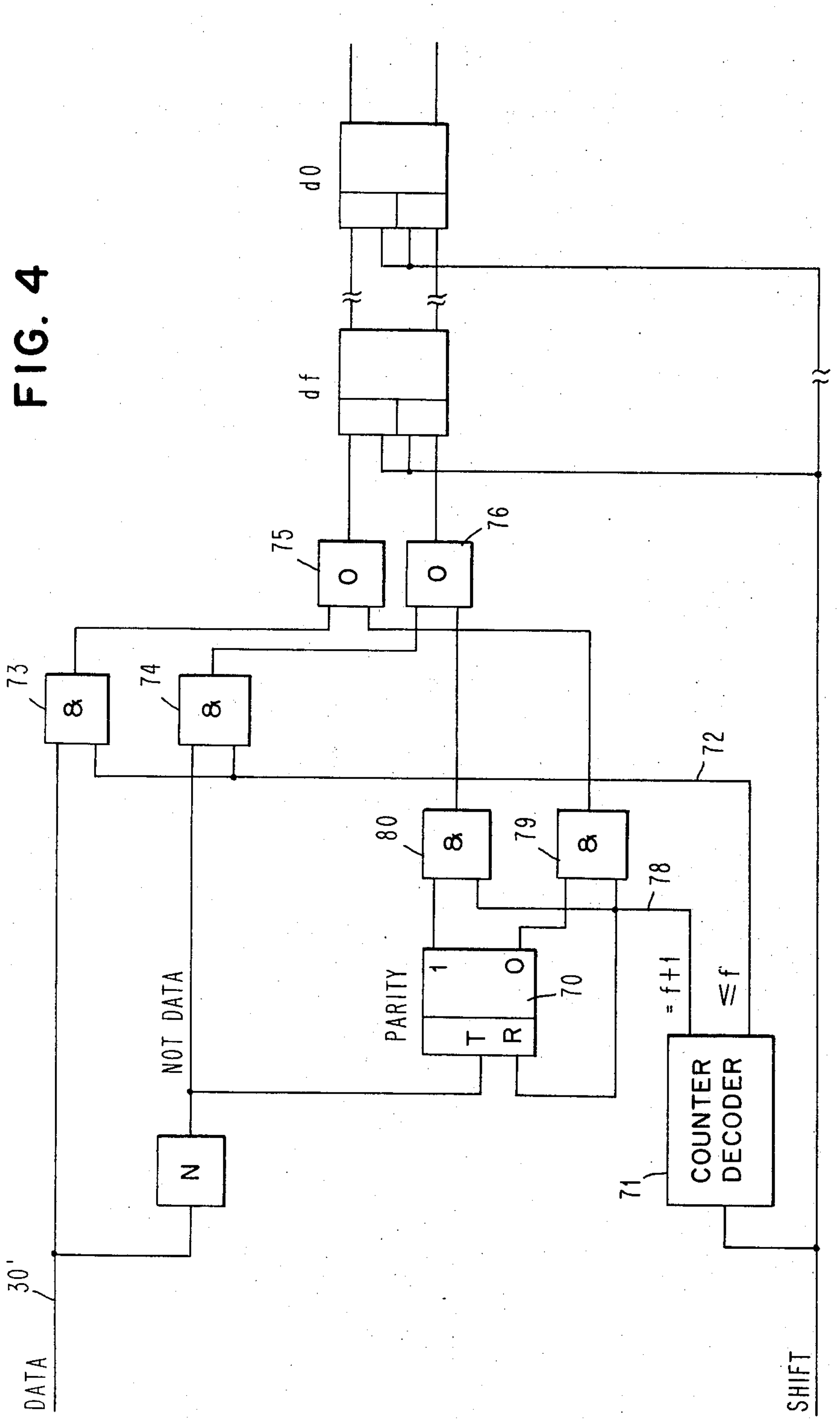
FIG. 4 is a logic diagram showing modifications of the circuit of FIG. 2 for an encoder of finite storage capacity.

Sections II, III, and IV describe the coding circuits of FIGS. 2, 3, and 4. These sections explain the operation of the coding circuit from a circuit diagram standpoint and provide an introduction for a more thorough understanding provided later. Sections V, VI, and VII provide a theoretical proof that the charge and frequency constraints of the objects of this invention can be met. Sections IX and X show the relationship of the theoretical proof to the coding circuits of Sections II, III, and IV. Section XI shows a logic circuit for detecting invalid patterns that are caused by errors.

II — The Encoding Circuit of FIG. 2.

Figure 1:
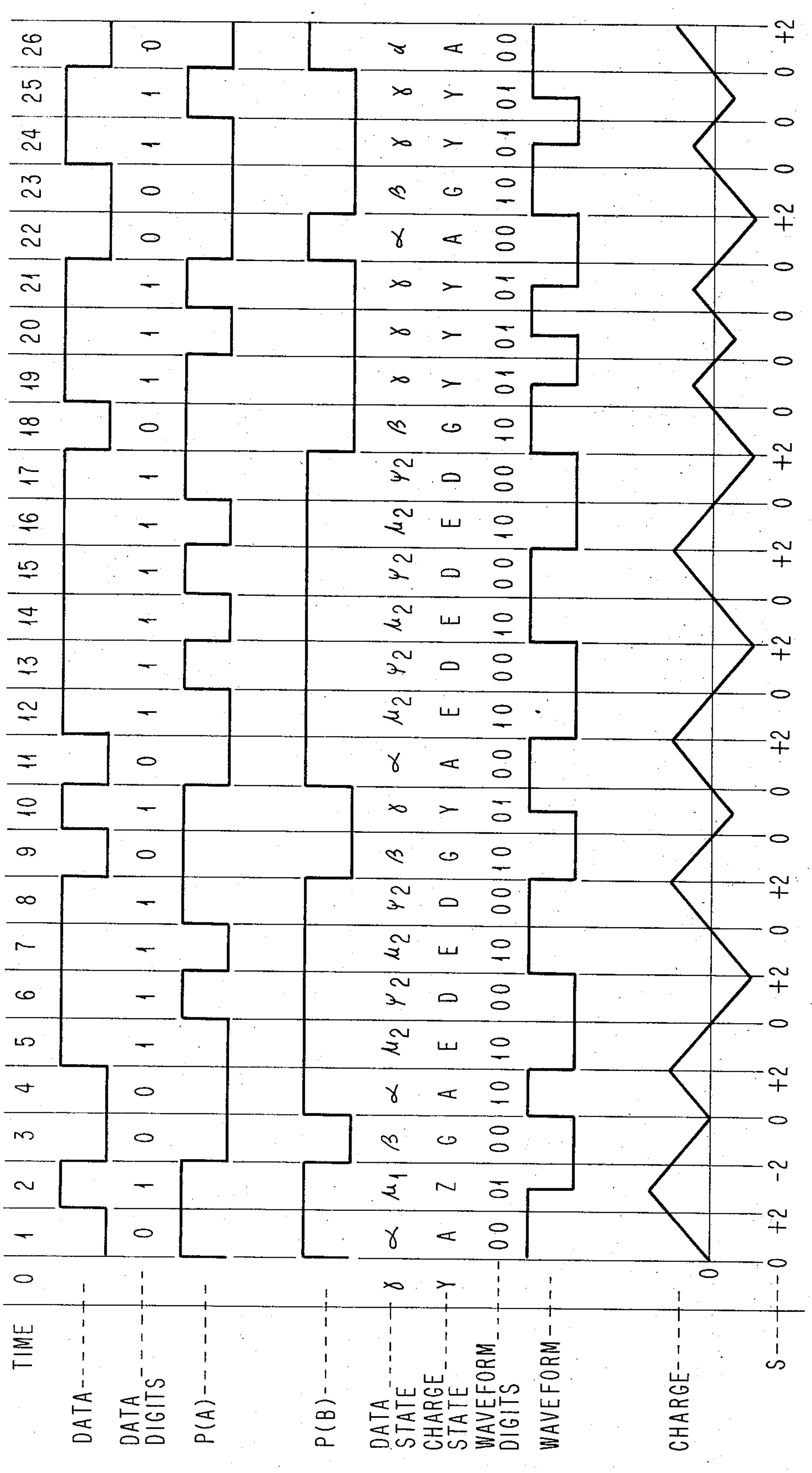
FIG. 1 shows a sample sequence of data digits and various waveforms that illustrate the encoder and decoder of this invention.

The circuit of FIG. 2 receives binary data at an input 30 in the form of electrical pulses illustrated by the waveform designated "Data" in FIG. 1. A data digit is designated $d$ with a number subscript. Digit $d_0$ is the digit being encoded or decoded, $d_1$ is the next digit to be encoded or decoded, and digit $d_{-1}$ is the last digit that has been encoded or decoded. Thus, FIG. 1 represents from left to right a sequence of digits such as $d_{-a}$, $d_0$, $d_1$, and $d_2$. A data digit $d_0$ is encoded to form a pair of waveform digits designated $a_0$, $b_0$. The circuit of FIG. 2 operates according to the logic function shown in the drawing to produce the waveform digits $a_0$, $b_0$, at an output 31. Conventional NRZI (non-return to zero) circuits 32 produce a transition for each 1 at output 31 in the signal to form the signal designated "Waveform" in FIG. 1. From the NRZI circuits 32, the waveform is applied to a waveform receiving medium 33 such as a transmission line or a magnetic tape. The circuit of FIG. 2 includes a clock 35 that produces appropriate shift signals on a line 36 to define data digit intervals in the encoding circuit. In FIG. 1, these intervals are shown by faint column lines and by sequential column numbers designated "Time." Clock 35 also produces a signal that defines the first half and the second half of a data digit interval, designated ta and tb respectively; the first half of the digit interval corresponds to the waveform digit $a_0$ in the waveform and the second half of the digit interval corresponds to the waveform digit $b_0$.

Latches that are identified by the designation of a corresponding data digit are connected to form a shift register. The five stages shown in FIG. 2 represent a register that is infinitely long, as indicated by the break in the lines between the first or high order latch $d_n$ and the next latch $d_0$. A shift register of a limited number of stages can be considered to be infinitely long if the data is not likely to contain a sequence of consecutive 1 digits that is long enough to fill the register. For example, an encoder with a few hundred register stages may be considered infinite in the sense that errors are not introduced too often by the limited storage capacity; or the data at input 30 may be previously encoded in blocks (e.g., a parity check) to limit the length of a sequence of 1 digits. The rightmost or lower order register position in the drawing is designated $d_{-1}$ and each higher order register position holds the next digit of the data pattern.

A trigger circuit 37 is connected to respond to the complement output of latch $d_0$ to form the parity of 0 digits in the data pattern from the beginning of an encoding operation. This latch produces the signal designated P(B) (for "backward parity") and its complement. FIG. 1 shows this function for the data pattern of the example. As will be explained later, the function P(B) makes the output $a_0$, $b_0$ on line 31 depend in part on the preceding data pattern.

A parity function P(A) (for "ahead parity") is the parity of 1 digits in the data pattern starting with stage $d_0$ and ending with the first higher order stage having a 0. Thus, the patterns 10, 1110 and 111110 at the outputs of AND gates 38, 39 and 40 show three such patterns and these gates and gates 41, 42 cooperate to form the function P(A) and its complement. The sample waveforms of FIG. 1 show other such patterns. The logic of FIG. 2 is simplified by eliminating patterns such as $d_0$, $d_1 = 1, 0$ for which the function P(A) = 1 is not used in the circuit and by logically simplifying the inputs by conventional logical reduction techniques. The circuit sequence represented by gates 38, 39, 40 is extended to include the register stage for digit $d_n$ in the function P(A).

Gates 45, 46 and 47 receive various inputs and produce the signal $b_0$ on a line 48. The signal on the line 48 is also applied to a latch 49 which holds this signal for one digit interval and thereby produces the output $b_{-1}$ which is one of the inputs to gate 46. The other inputs to the gates can be understood readily from the direct relationship of the circuit to the equation for $b_0$ shown in the lower right hand portion of FIG. 2. Gate 47 corresponds to the logical product of the term $d_0$ and the bracketed terms. Gate 45 corresponds to the product P(A) And Not $d_{-a}$, and gate 46 corresponds to the logical sum within the brackets.

Gates 50, 51, 52, 53 and a latch 54 form the waveform digit $a_0$ on line 56. The operation of latch 54 is analogous to the operation of latch 49 as has already been described. AND gates 50, 51, 52 correspond to the three logical products in the equation for $a_0$, and OR gate 53 corresponds to the three logical sums of these products in the equation.

Three gates 57, 58, and 59 combine the parallel signals $a_0$, $b_0$, on lines 56, 48 with the sequentially appearing timing signals $ta$, $tb$, to form the series waveform sequence $a_0$, $b_0$ on line 31.

From the description of the encoding circuit of FIG. 2 and from the corresponding equations for the waveform digits $a_0$ and $b_0$, it can be seen that the waveform digits are a function of the digit being encoded, $d_0$, the previously encoded waveform digits, $a_{-1}$, $b_{-1}$, the previously encoded data digits, and a sequence of data digits that are yet to be encoded. As will be explained later, the circuit in fact meets the objects of charge and frequency constraints of this invention.

III — The Decoding Circuit of FIG. 3

The decoding circuit of FIG. 3 receives the encoded waveform on a line 60 from the waveform receiving medium (33 in FIG. 2). Clocking circuits 62 respond to the waveform on line 60 to produce clock pulses on a line 64 and shift pulses on a line 63 that are synchronized with the incoming data. An NRZI waveform detector 61 receives the clock pulses and converts the waveform to an electrical signal representing the waveform digits. These waveforms are illustrated in FIG. 1. These features of the decoder are conventional and a variety of suitable components are well known in the art.

Six latches are connected to form a shift register for holding the six waveform digits for three consecutive data digits and the latches and their outputs are identified by the designation of the associated waveform digit. The circuit operates to produce the data digit $d_0$ on a line 64 and the latches include the corresponding waveform digits $a_1$, $b_0$. In addition, the latches hold the waveform digits $a_{-1}$, $b_{-}1$ for the preceding data digit $d_{-1}$ and the waveform digits $a_1$, $b_1$ for the next data digit to be decoded $d_1$. Three gates 66, 67, and 68 receive inputs from the register according to the equation shown in the drawing. The three inputs to OR gate 68 correspond to the three components of the logical sum in the equation and AND gates 66 and 67 form the two products in the equation.

The circuit of FIG. 3 may also include a trigger circuit 69 that provides the signal P(B) the parity of 0 digits in the encoded data, and a trigger 71 that provides the signal P(B1), the parity of the last sequence of 1 digits in the data. These signals are used in the error detection circuit of FIG. 11.

IV — The Encoding Circuit With Finite Storage — FIG. 4

For encoding with a shift register of finite length, the data is organized as blocks having a length designated $f$ and one additional bit is generated at position $f$+1 to make the encoding of a block independent of the data of the following block. (The encoding is in fact independent of the preceding data blocks as well.)

The circuit of FIG. 4 operates to generate a 1 or a 0 in position $f$+1 to make P(B) equal 0 at bit position $f$+1. In the circuit of FIG. 4, a trigger circuit 70 is connected to receive the input Not Data (shown in FIG. 2 as the reset input to latch $d_n$) so that latch 70 registers the data parity P(B) for register stage $d_f$ in the same way that trigger circuit 37 in FIG. 2 registers the parity P(B) for stage $d_0$ and preceding stages. A counter-decoder 71 responds to the Shift signals produced by clock 35 (shown in FIG. 2) to count in a repeating sequence as data bits $d_0$ through $d_f$ and the parity bit of position $f$+1 are entered into the register. For a count equal to or less than $f$, a line 72 is energized to open gates 73 and 74 for applying the Data and Not Data signals through OR gates 75, 76 to the set and reset inputs of register stage $d_f$. When the count reaches $f$+1 for data position $f$+1, a line 78 is energized to enable AND gates 79, 80 to set register stage $d_f$ to the appropriate parity value established by parity trigger circuit 70. An example will help to explain this circuit.

Consider times 1 through 8 in FIG. 1 as representing a block of 8 data bits and time 9 as representing a parity bit. The parity P(B) is 0 at the beginning of the encoding operation and as a 0 data digit is loaded in register stage $d_f$ at time 1, trigger 70 is set to its 1 state. Thus, trigger 70 follows the waveform P(B) of FIG. 1 as data enters stage $d_f$ in the same way that trigger 36 of FIG. 2 follows the waveform P(B) as this data enters register stage $d_0$. At time 9 in FIG. 1, the waveform P(B) is returned to 0, corresponding to the fact that the data pattern has a 0 in three positions and in the parity position. (An even number of 0 digits returns P(B) to its initial position, P(B)=0.)

The logic circuits and equations of FIG. 2 show the effect of selecting digit $f$+1 to set P(B) to 0 at the end of each block. In AND gate 51, the input P(B)=0 has the effect of masking the value of the input P(A); the output of gate 51 is 0 without regard to the value of the input P(A). Similarly, the input Not P(B)=1 to OR gate 46 masks the value of P(A) at the input to AND gate 45. The equations of FIG. 2 can be written in a simplified form for the condition P(B)=0.

$$a_0 = \overline{d_0}\,\overline{d_{-1}} + d_{-a}\,\overline{a_{-1}}\,\overline{d_{-1}}$$

$$b_1 = d_0$$

From these equations, it can be seen that the parity bit can be encoded without regard to the value of P(A).

For each other bit position of the data block, the term P(A) either is not required or can be formed from the contents of register stages $d_0$ through $d_f$. Suppose that a data block of all 1 digits is loaded into the shift register. Since P(B)=0 at the beginning of this operation and a change occurs only with a 0 data bit, the parity bit produced by trigger circuit 70 is also a 1. By constrast, in the example of the infinite length storage register of FIG. 2, the value of the term P(A) cannot be computed in such a situation. However, because the encoding of a data block begins with the condition P(B)=0, the term P(A) is not used in encoding this sequence of 1 data digits. This can be seen from the equations of FIG. 2 from the fact that the terms P(A) and Not P(A) appear as AND logic products with the term Not $d_{-1}$. Thus, the term P(A) is significant only in encoding a 1 digit following a previously encoded 0 digit.

If there are an odd number of 0 digits in the data portion of a block, the parity bit formed by trigger circuit 70 is a 0. In this situation, the encoding proceeds as though the storage was in fact infinite, as explained in the description of FIG. 2. When there are an even number of 0 digits in the data portion of a block, the block contains a 0 followed by a sequence of 1 digits. Although such a sequence cannot be encoded in the infinite register length circuit of FIG. 2, in the circuit of FIG. 4, the final 0 is accompanied by the condition P(B)=0 and the value of the term P(A) is not used in the encoding operation.

Since the data digits of a block can be encoded without regard to the data content of the preceding block or of the following block, data bits from the following block can be shifted into the register without affecting the value of the term P(A). To continue the example already introduced, suppose that the data for times 1, 2, and 3 have been encoded and that the data bits for times 4 through 8 and the parity bit of time 9 have been shifted into register positions $d_0$ through $d_5$. The data digits of times 10, 11, and 12 have been shifted into register stages $d_6$, $d_7$, and $d_8$. Parity trigger 70 holds the value P(B)=1 as shown in column 12 of FIG. 1 and trigger 36 (shown only in FIG. 2) holds the value P(B)=1 shown in column 4 of FIG. 1. In the components of the circuit that are shown in FIG. 1, the 0 digit in register stage $d_0$ inhibits gates 38, 39, and 40 from producing an output. Other examples will be suggested by the analysis of the preceding paragraph.

V — Charge Accumulation

The invention has been described so far in terms of the equations for encoding and decoding and the logic and storage circuits that the equations describe. It can be seen from the example of FIG. 1 that the accumulated charge has a maximum value of plus or minus three charge units, but to understand how the objects of charge constraint are achieved, it will be helpful to depart from the analysis used so far and to follow the analysis presented by FIGS. 5 through 10.

As can be seen from FIG. 1, each digit of the waveform contributes one unit of charge to the accumulated charge. A 0 waveform digit continues the waveform polarity and the direction of charging and a 1 waveform digit reverses the waveform polarity and the direction of charging. Thus, the waveform digits 00 add two units of charge in the polarity that was established by the first preceding waveform 1 digit. Similarly, the waveform digits 01 reverse the polarity without changing the absolute value of charge and the waveform digits 10 reverse the polarity and provide two charge units. Since the polarity of the waveform is entirely arbitrary, it is convenient to consider that the last preceding 1 waveform digit produced a transition to the positive level. With this assumption, the waveform digits 00 add two units of charge, the waveform digits 10 change the sign of the accumulated charge and add two units of charge, and the waveform digits 01 change the sign but not the absolute value of the charge. The charge accumulation as defined by this convention is designated S in FIG. 1.

An example will help to explain this convention. In the example of FIG. 1, the encoding operation begins at time 1 with the circuits in a state of zero charge. The first digit is encoded as $a_0$, $b_0$ = 00 and the resulting waveform, which is shown arbitrarily beginning at a positive level, continues positive throughout time 1. By the convention introduced in the preceding paragraph, the charge S increases by two units from 0 to +2. Note that the polarity of the waveform and the polarity of the charge value S are the same only because the waveform was arbitrarily considered to be positive at the beginning of time 1. In time 2, the digit is encoded as $a_0$, $b_0$ = 01 and the waveform changes polarity midway in time 2. The term $a_0 = 0$ continues the waveform polarity and adds one unit of charge and the term $b_0 = 1$ reverses the waveform polarity and provides one discharge unit. By the convention introduced in the preceding paragraph, the polarity of the charge value S is changed from plus to minus but the absolute value remains unchanged. Notice that the charge waveform and the charge value S shown in FIG. 1 have the same absolute value but have opposite polarities. For most physical devices the actual polarity of charge accumulation is not significant but the absolute value is significant. Thus, the convention is a valid simplification of the problem of calculating the effect of the waveform digits on the accumulated charge.

Figure 7:
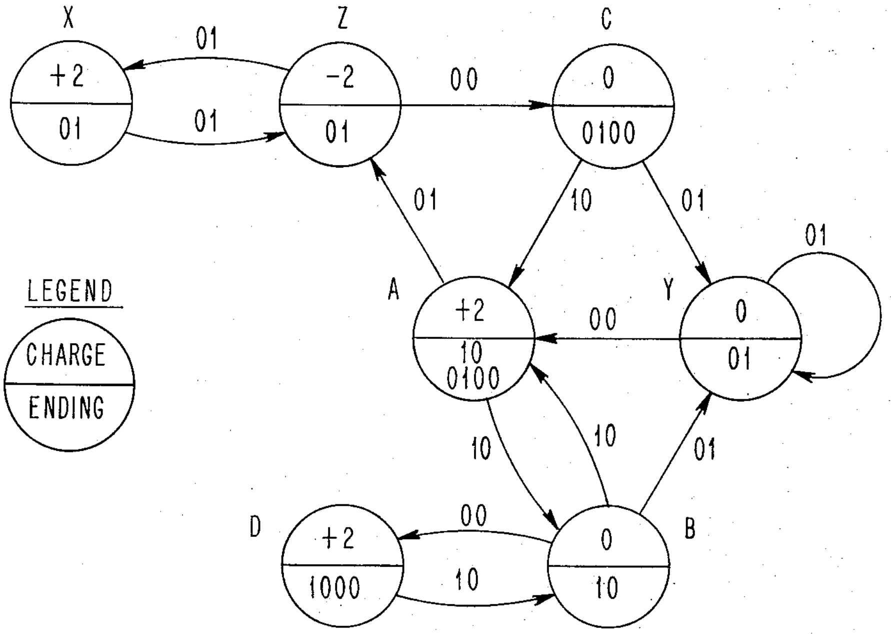
FIG. 7 shows the table of FIG. 6 with charge and waveform digit states represented in circles and the data waveform digit pairs represented as paths leading from one state to another.

VI — The Charge State — FIGS. 5, 6, and 7

In the table of FIG. 5, the column headings show the ending digits of the waveform. The convention introduced in Section V was based on an ending sequence having the last 1 digit and any following 0 digits and the column headings of FIG. 5 show all of these combinations. (A 0 digit preceding a 1 digit is shown where necessary to group the waveform digits in pairs that correspond to a data digit interval.) The row headings show the charge S. The entries in the table show designations that will be used for the state of the encoding operation for a particular ending waveform and charge value. For example, when the charge value is 0 and the ending waveform is 01, the operation is in state Y. If the next pair of waveform digits is 00, the charge state changes from Y to A' because the column heading 01 00 describes the new ending waveform and the row heading +2 describes the charge state. (The same example is shown in FIG. 1 for times 0 and 1.)

FIG. 6 is a table that extends the example of the preceding paragraph to all possible transitions between charge states. The row headings define the charge state at the beginning of an encoding operation. The column headings define the three possible waveform digit pairs that might be produced as a result of an encoding operation, and the entries show the charge state that would result from the encoding operation. Thus, the previous example of the transition from state Y to state A' is shown in the row for state Y and the column for the encoded waveform digit pair 00. Dashes appear in FIG. 6 where the encoding operation would violate the frequency constraints and such a transition is not produced by the encoding circuits of FIGS. 2 or 4.

Notice that state S(4) does not violate the frequency constraints but it does violate the charge constraint. Suppose for example that the encoding operation is in state A with an ending waveform 10 and a charge S=+2. (This example occurs at time 4 in FIG. 1.) Considering only the frequency constraints, the 10 ending waveform might be followed by any of the three possible waveform digit pairs. However, if the next data digit is encoded as $a_0$, $b_0$, = 00, the charge would increase from +2 to +4 and the charge constraint would be violated.

FIG. 7 shows the tables of FIGS. 5 and 6 in a different arrangement. The letter accompanying a circle identifies the charge state. The upper half of a circle shows the charge value S from the row headings of FIG. 5 and the lower half shows the waveform ending from the column headings of FIG. 5. For example, the upper leftmost circle represents charge state X for which the ending waveform is 01 and the charge value is +2, and the same information appears in the upper leftmost entry in the table of FIG. 5. The circles are innerconnected by arrowed paths that are identified by the waveform digit pairs that are shown as column headings in FIG. 6. For example, the transition from state X to state Z that is shown in the uppermost row of FIG. 6 is represented by an arrow leading from the circle for state X to the circle for state Z. Notice that state S(4) which violates the charge constraint is not represented in FIG. 7. In addition, the states N(1), N(2), N(3), and N(4) are not shown in FIG. 7 because there is no valid transition into these states when an encoding operation begins with 0 charge. FIG. 7 is also simplified by merging state A' with state A. This merger is justified by the fact that the charge states are the same for both A and A' (S=+2) and that the exits are the same for both states: $a_0$, $b_0$ = 01 leads to state Z and 10 leads to state B. Notice that FIG. 7 relates only to the charge and the ending waveform, and so far in this description the paths between charge states have not been considered as representing data digits.

FIG. 7 shows the difficulty of encoding within the frequency and charge constraints. From charge state Y in FIG. 7, there are two exits, 00 and 01, and one of these paths can be used for encoding a 1 and the other for encoding a 0. By contrast, states D and X in FIG. 7 each have only a single exit and only one binary number can be represented when the encoding operation is in either charge state X or D. Section VII will show that data states can be arranged in a diagram that is closely isomorphic to FIG. 7, and Section VIII will explain how the charge state diagram of FIG. 7 can be modified to be fully isomorphic to the data state diagram so that data significance can be assigned to the allowable charge state transitions.

Figure 8:
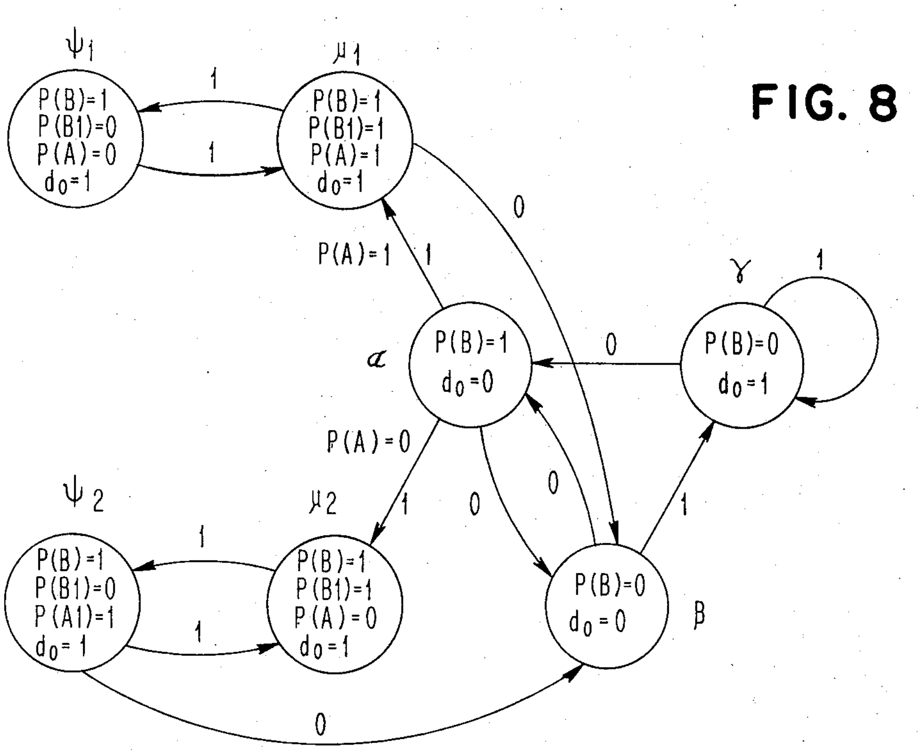
FIG. 8 shows data digit sequences in a form that is closely similar to the charge state diagram of FIG. 7.

VII — The Data State — FIG. 8

FIG. 8 shows the data states in an arrangement that is closely isomorphic to the charge state diagram of FIG. 7. This diagram is based on the parity functions P(A), and P(B) already described. (The function P(B1) will be referred to in Section XI.) Arrowed lines between circles are identified by data digits. The states are identified in FIG. 8 and in FIG. 1 by the characters Alpha, Beta, Gamma, Mu 1, Mu 2, Psi 1, and Psi 2. For example, the rightmost circle in FIG. 8 represents the data state when a 1 data digit has been encoded and the parity function P(B)=0. If the next data digit to be encoded is a 0, the operation changes to data state Alpha where P(B)=1.

Notice that data states Alpha, Psi 1, and Mu 1 in FIG. 8 are isomorphic to charge states A, X, and Z in FIG. 7. In addition, data state Mu 1 has an exit to data state Beta that corresponds (as will be shown in Section VIII) to the exit from charge state Z to charge state C. In the data state diagram of FIG. 8, state Alpha is a 0 data digit state, states Mu 1 and Psi 1 are 1 data digit states, and state Beta is a 0 data digit state. For example, the data digit sequence 010 can be represented by the data state sequence Alpha, Mu 1, Beta. The data digit sequence 01110 can be represented by the sequence of data states Alpha, Mu 1, Psi 1, Mu 1 and Beta. To generalize these examples, from data state Alpha the exit to data state Mu 1 permits any odd numbered sequence of 1 data digits. In FIG. 1, times 1, 2 and 3 show an example of these data state and charge state transitions.

The significance of the parity function P(A) can be better understood from the example of the preceding paragraph. The parity function P(A)=1 means that there is an odd numbered sequence of 1 data digits to the next 0 data digit. This example appears at time 1 in FIG. 1. Such a sequence permits the use of charge state X which has a single exit and thus must be followed by a fixed data digit.

Data states Mu 2 and Psi 2 provide a path from data state Alpha for representing a sequence of an even number of 1 data digits. As will be explained in Section VIII, these data states correspond in part to charge state D and permit using charge state D for representing data even though there is only one exit from state D. In FIG. 1, times 4 through 9 show the use of these data states for representing a sequence of four 1 digits and times 12 through 17 show the use of these data states to represent a sequence of six 1 digits.

Notice in FIG. 8 that data state Gamma provides an additional representation for a 1 data digit. Times 19 through 21 show a sequence of three 1 data digits represented by state Gamma. States Alpha and Gamma are distinguishable by the fact that all transitions between these states require an odd number of 0 data digits, so that the value of the function P(B) differs for the two data states. For state Gamma, P(B)=0 and for state Alpha, P(B)=1. (The values of P(B) and P(B1) shown for other data states of FIG. 8 are significant for error detection and will be discussed in Section XI.)

Figure 10:
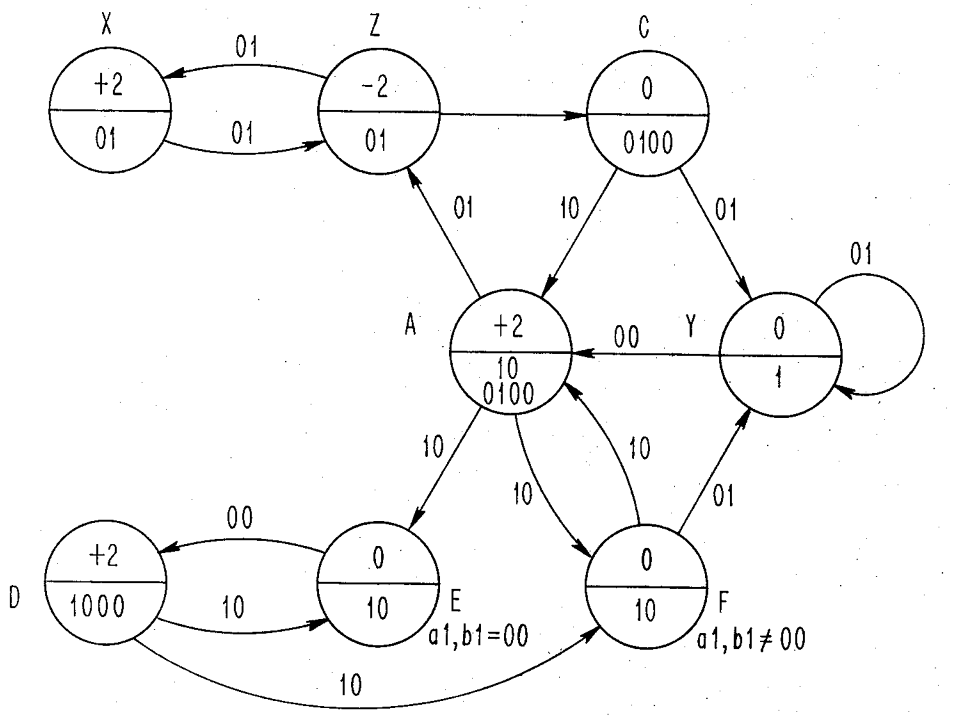
FIG. 10 is an intermediate diagram that helps explain the relationship of FIG. 9 to FIG. 7.
Figure 9:
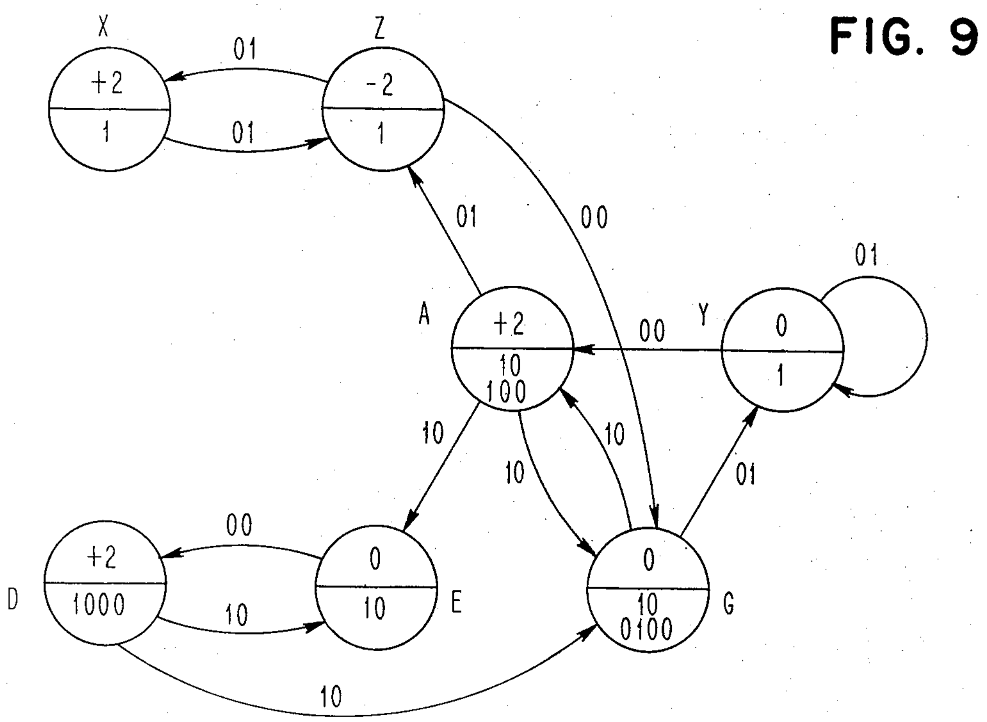
FIG. 9 is a modification of the charge state diagram of FIG. 7 that is isomorphic to the data state diagram of FIG. 8.

VIII — The Modified Charge State Diagrams — FIGS. 9,10

FIG. 10 is identical to FIG. 7 except that charge state B is shown as two separate charge states, E and F. States E and F are identical to state B in representing the ending waveform digits 10 and the charge state S=0. All of the entrances and exits for charge state B appear as exits and entrances for either or both charge states E and F. For example, charge state B has two entrances, one from state A and one from state B. In the modified state diagram of FIG. 10, these entrances lead to both charge states B and F. Charge state B has three exits to states Y, A, and D, and in FIG. 10 state E has the exit state to D and state F has the exits to state Y and A. Thus, states E and F differ by having differently encoded exits: as FIG. 10 shows, the exits from state E is encoded $a_1, b_1 = 00$ and the two exits from state F are encoded $a_1, b_1 \neq 00$. The encoding and decoding circuits of this invention are arranged to distinguish states E and F on the basis of the data patterns.

FIG. 9 is identical to FIG. 10 except that charge states C and F have been merged to form charge state G. Both charge states C and F have the same charge value, S=0. Although the waveform endings for states C and F differ, they can be merged for the same reasons discussed in Section VI for merging states A and A'. Both states C and F have similar transitions to states A and Y and FIG. 9 shows the equivalent transitions from state G to states A and Y. Since the exits from states C and F are identical to the exits of the merged state G, the entrances to state G from states A and D are directly equivalent to the entrances to state F from state A and D. The entrance to new state G from state Z is also justified by the fact that the exits from state G are identical to the exits from state C. Thus, the charge state diagram of FIG. 7 can be seen to represent the charge and frequency constraint objects of this invention and the charge state diagram of FIG. 9 can be seen to be equivalent to the diagram of FIG. 7. Section IX will explain how the circuits of FIGS. 2 and 4 operate according to the isomorphism of FIGS. 8 and 9.

IX — Encoding and The State Diagrams

The relationship of the data state diagram of FIG. 8 to the encoding circuit of FIG. 2 can be readily seen. In FIG. 8 the only 0 data states are Alpha and Beta, and the transitions from A to G and from G to A are both encoded as $a_0, b_0 = 10$. Thus, at the input to gate 50 in FIG. 2, the term Not $d_{-1}$ defines data state A or G and the term Not $d_0$ defines a transition to the other of these two states. Thus, gate 50 produces the output $a_0$=1 for transitions between states A and G. At the input to gate 51, the terms Not $d_{-1}$ and P(B) define data state A and the term $d_0$=1 defines a transition to either state Z or state E. The term Not P(A)=1 defines the transition to state E for which gate 51 produces the output $a_0$=1. The inputs to gate 52 define data state D, the only data state that is entered by encoding $d_{-1}$=1 as $a_{-1}, b_{-1} = 00$. Thus, the circuit of FIG. 2 produces the signal $a_0 = 1$ on line 56 for each data state transition in FIG. 8 for which $a_0$ is encoded as a 1 in the charge state diagram of FIG. 9, and the circuit produces the signal $a_0$=0 for all other transitions.

The relationship of the state diagrams to the circuit components that produce the signal $b_0$ on line 48 can be understood most easily by removing the brackets in the equation of FIG. 2 to form this equivalent expression.

$$b_0=d_0P(A)\overline{d_{-1}}+d_0P(B)+d_0b_{-1}$$

The term Not $d_{-1}$ identifies state $A$ and the terms $d_0$ and P(A) define the transition to state $Z$ for which $b_0$ is encoded as a 1. (These terms may also produce a redundant 1 for the transition from state G to state Y, depending on the specific implementation of the circuit of FIG. 2.) Gates 45, 46, and 47 cooperate to produce this output. The term Not $P(B)$ identifies states G and Y and the term $d_0$ identifies the transitions from state G to state Y and from state Y to state Y for which $b_0$ is encoded as a 1. The terms $b_{-1}$ and $d_0$ define the transitions between states X and Z, and gates 46 and 47 produce the output $b_0$=1 on line 48 for these transitions.

X — Decoding and The State Diagrams

The decoder of FIG. 3 recognizes a data digit in terms of the associated transitions in the state diagrams. For example, suppose that $d_0$=1 and that the state is D. The transition into state D (from state E) was encoded as $a_0,b_0$=00; the preceding transition (from state A to state E) was encoded as $a_{-1},b_{-1}$=10; and the exit from state D to either state E or state G was encoded as $a_1,b_1$=10. All of these waveform digits are held in the decoder register but the terms $a_0\ a_{-1}\ \overline{b_{-1}}$=1 are sufficient to identify that the state that is associated with waveform digits $a_0$, $b_0$ is state D (or state Z) and that $d_0$=1.

From these examples of the terminology, it will be easy to understand the significance of the logic equations and circuit of FIG. 3. The term $b_0$ defines transitions that are encoded as 01: Y to Y, G to Y, A to Z, X to Z and Z to X. Thus, all the transitions are identified to states Y, Z and X for which $d_0$=1. The term $a_0\overline{a_1}\overline{b_1}$ defines state E where the entrance from state A or state D is encoded in part as $a_0$=1 and where the exit to state D is encoded as $a_1,b_1$=00. The term $a_0a_{-1}\overline{b_{-1}}$ defines state D and state Z as described in the example of the preceding paragraph.

Figure 11:
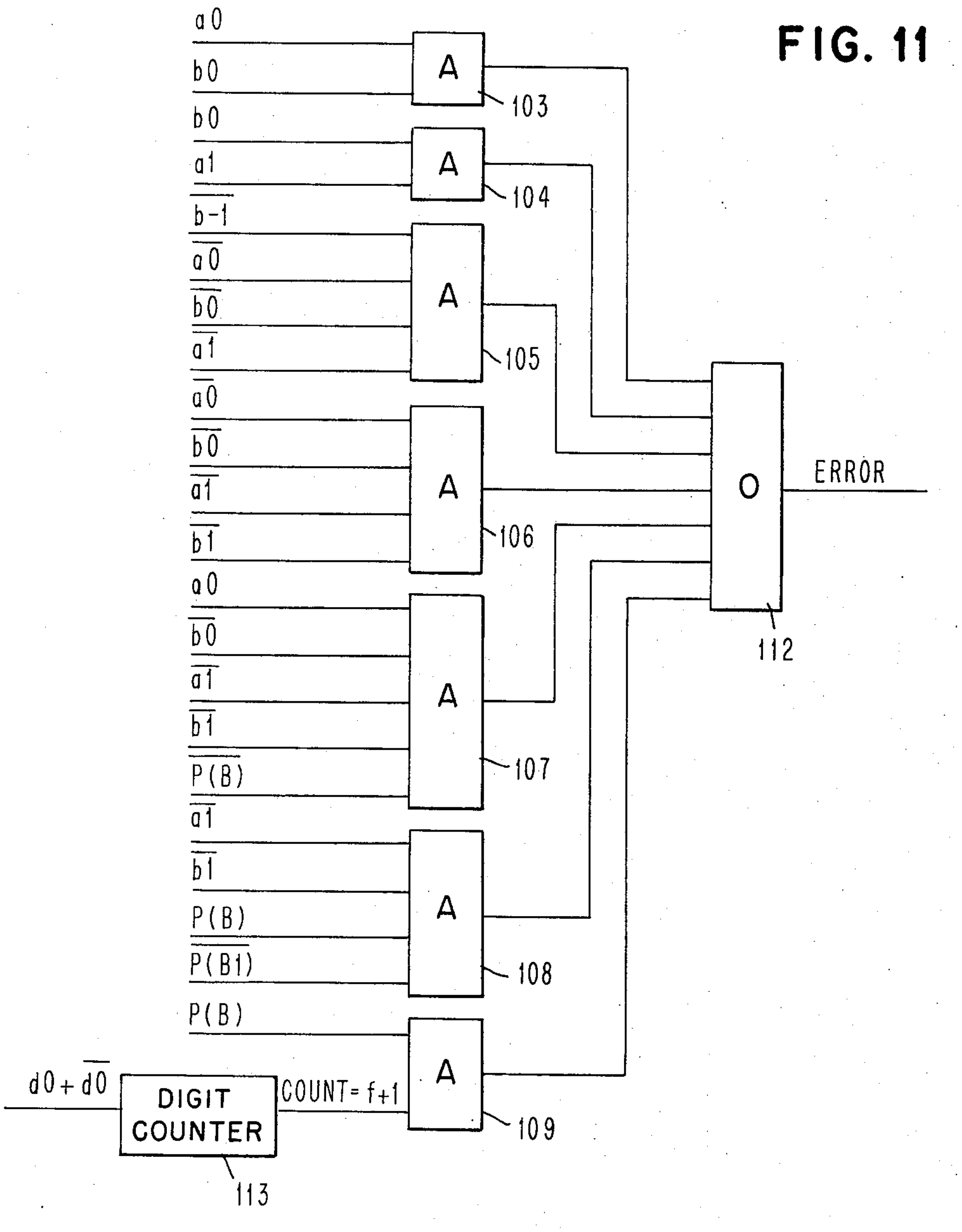
FIG. 11 is a logic diagram of an error correction circuit that is useful with the decoder of FIG. 3.

XI — The Error Detection Circuit of FIG. 11

In the circuit of FIG. 11, gates 103 through 112 and a digit counter 113 cooperate to detect errors in the information supplied to the circuit of FIG. 3 on line 60 or in the operation of the circuits in FIG. 3. At the inputs to gates 103 and 104, the inputs $a_0$ And $b_0$=1 Or $b_0$ And $a_1$=1 signifies that there are two adjacent 1 waveform digits, either in the same digit interval (gate 103) or in two adjacent data digit intervals (gate 104). Similarly, gate 105 detects four adjacent 0 waveform digits in two adjacent data digit intervals and gate 106 detects four adjacent 0 waveform digits in three adjacent data digit intervals. Thus, gates 103 through 106 and 112 detect any violation of the frequency constraints.

The operation of gate 107 can be understood from FIG. 6 and the state diagrams. As FIG. 6 shows, there are only two encoding operations that violate the charge constraint: encoding a transition from state X as the waveform digits 00 or encoding a transition from state A as the waveform digits 00. (Other violations of charge constraint will be detected in gates 103 through 106 as violations of the frequency constraints.) At the input to gate 107, the terms $a_0$, Not $b_0$, and P(B) define state A and the terms Not $a_1$ and Not $b_1$ define the encoding operation that would produce a transition from state A to state S(4) in violation of the charge constraint. (These inputs also define the transition from state D that violates the frequency constraint.) Notice that the term Not P(B) in FIG. 11 is formed by the decoder of FIG. 3 whereas the other terms are formed by the encoder of FIG. 2 or 4. For example, the transitions Y to A to Z may be correctly encoded and transmitted as 01, 00, 01 but a clocking error may cause the waveform digits to be received as —0, 10, 00, and in this case the digit interval for state A will be decoded as a 1 and the parity function P(B) will remain at 0.

At the input to gate 108, the terms P(B) and Not P(B1) define state X and the terms Not $a_1$ and Not $b_1$ define the invalid transition to charge state S(4). These inputs also define a transition from state D that violates the frequency constraints.

Gate 109 is used only with the embodiment of this invention in which data is transmitted as blocks with a parity bit at position $f$+1 (FIG. 4). A digit counter 113 produces the output Count=$f$+1 (also shown on line 78 of FIG. 4). Counter 113 is advanced in a repeating sequence through a count value $f$+1 in response to signals $d_0$ Or Not $d_0$ (or equivalent signals) which define data intervals. At time $f$+1, the parity function P(B), shown in FIG. 3, should equal 0 and if P(B) equals 1 at count $f$+1, gates 109 and 112 produce a 1 logic level output signifying an error.

An error signal at the output of gate 112 tells that an error has occurred in one of the nearby data digit positions. Techniques for using error signals of this type are well known for specific kinds of waveform receiving devices. For example, in magnetic tape the data digits commonly represent a message encoded in an error correction code, and the information from the error correction circuits is combined with signals called pointers that help to identify where an error may have occurred. Similarly, the clocking error identified by gate 107 can be corrected by rereading the tape. The output of gate 112 provides additional pointers for this operation.

XII — Other Embodiments

At the beginning of an operation the encoder and decoder are at zero charge state because the charge accumulating components have become discharged or because conventional means is provided to discharge these components. The registers, which further define the operating state, may be in some undefined state or they may be reset to 0 state or to a particular pattern. As the invention has been described so far, before a data message is encoded a series of 1 digits are encoded as $a_0,b_0$=01 to put the encoder and the decoder in state Y at time 0 and to synchronize clocking circuits 62. Similarly, an even number of 0 digits encoded as $a_0,b_0$=10 will put the system in state G at time 10. From a more general standpoint, circuit means is provided and/or a data encoding operation is performed that puts both the encoder and the decoder in a preselected one of the seven states and synchronizes clocking circuits at time $t$0. It is convenient to modify the encoding process for the clock synchronizing waveform digits to violate the frequency or charge constraint (by 4 or more adjacent 0 waveform digits) so that the sequence can be distinguished from a valid data message.

For a multi-track magnetic tape or similar devices it may be preferable to encode or decode a block of data bits in parallel. The circuit shown in the drawing for a single bit position may be provided for each bit position to be encoded or decoded in parallel; such a circuit can be simplified by conventional simplification techniques.

It will be understood that the designation of particular binary digits as 1 or 0 is arbitrary. Thus, from a more general standpoint a 1 waveform digit produces a transition in an NRZI waveform and introduces an upper frequency constraint consideration and a 0 waveform digit does not produce a transition in an NRZI waveform and introduces a low frequency or clocking constraint consideration. From a more general standpoint, a 1 data digit is encoded in part in states having single exits and thus requires the look ahead and look back functions for choosing among alternate encoding paths. These terms will be used in the claims in this general sense to avoid the abstractions that are otherwise required to express this relationship.

Within the scope of the claims and the spirit of the invention, those skilled in the art will recognize many applications for the coding circuits of this invention and appropriate modifications to the various embodiments that have been described.

What is claimed is:

1. Apparatus for encoding binary digits into a waveform having first and second intervals for each data digit interval, comprising:

means for storing a sequence of digits to be encoded;

means responsive to said storing means for forming a first parity function of a data digit to be encoded and subsequent data digits;

means responsive to said sequence of digits to be encoded for forming a second parity function of a data digit to be encoded and previously encoded data digits;

means for encoding a data digit as a transition in said first interval, as a transition in said second interval, or as the absence of a transition in either interval, including;

means preventing the encoding of two transitions in the two intervals of one data digit and means responsive to the encoding of a transition in the immediately preceding second interval for preventing the encoding of a transition in said first interval, and means responsive to said first parity function to encode one of said data digits as a transition in said first interval when said second parity function has a first value and as a transition in said second interval when said second parity function has a second value.

2. Apparatus for encoding bits of a message comprising:

means forming a first parity function of the parity of 0 data digits in the previously encoded portion of said message and the digit to be encoded;

means forming a second parity function of the parity of 1 data digits in the sequence of said digit to be encoded and any following digits preceding a first 0 data digit;

means for encoding said data digits as digit pairs 00, 01, and 10 according to the binary value of the digit to be encoded, the last digit encoded, and the digit pair encoded from said last data digit for preventing in a sequence of said digit pairs the occurrence of more than one adjacent 1 digit or more than three adjacent 0 digits, and means responsive to said first and second parity functions for encoding a 1 data digit following a 0 data digit on the occurrence of a predetermined value of the first parity function as the digit pair 01 when the second parity function has a first value and as 10 when the second parity function has a second value.

3. Apparatus for encoding data digits as digit pairs 00, 01, 10 with a maximum accumulated charge following a digit pair in the encoded waveform of two charge units, where a charge unit is the charge contributed by one of the digits of a digit pair, comprising:

logic and storage circuit means identifying seven states of charge and data, two of said states representing 0 data digits and five of said states representing 1 data digits, including;

means for forming the parity of 0 data digits including and preceding a digit to be encoded for distinguishing a state of an encoded 0 data digit and zero charge from a state of an encoded 0 data digit and two units of charge;

means forming the parity of 1 data digits in a sequence of 1 data digits preceding the next 0 data digit for distinguishing sequences having odd and even numbers of continuous 1 data digits;

and means for encoding the transition from one data state to the next, including means responsive to said parity functions for encoding a 1 data digit following said state of 0 data and two units of charge as a transition to a predetermined one of said 1 digit states when said parity of 1 digits is odd and to another of said 1 digit states when said parity of 1 digits is even.

4. Apparatus for encoding data comprising:

means for forming a first parity function of 0 data digits preceding and including a digit to be encoded, whereby first and second states are identified for 0 data digits;

means for forming a second parity function of 1 data digits following and including the digit to be encoded and preceding a 0 data digit, whereby sequences of 1 data digits are identified as having an odd number or an even number of 1 data digits;

and means for encoding data digits into digit pairs 10, 01, and 00, including;

means responsive to a predetermined condition of said first and second parity functions for encoding a 1 data digit following a 0 data digit of said first state as one of said digit pairs when said second parity function has a first value and as another of said digit pairs when said second parity function has a second value, and means responsive to other predetermined conditions of said first parity function, the preceeding data digit, and the preceeding data digit pair for encoding a data digit as one of said data digit pairs 10, 01, and 00.

5. The apparatus of claim 4 including means connected to receive said digit pairs and to produce a waveform having transitions between two signal levels representing a 1 in said digit pairs and having the absence of a transition representing a 0 in said digit pairs.

6. The apparatus of claim 5 wherein said means for encoding data digits into digit pairs of the waveform includes means preventing the occurrence of two adjacent 1 waveform digits and preventing the occurrence of four adjacent 0 waveform digits, whereby a transition for clocking occurs in at least one of two adjacent data digit intervals and transitions occur no oftener than once in two adjacent waveform digit intervals.

7. The apparatus of claim 6 wherein said means for forming said second parity function includes means for storing a sequence of data digits to be encoded and logic means forming said parity function according to the contents of said storing means.

8. The apparatus of claim 7 wherein the data to be encoded has a predetermined maximum permissible number of sequential 1 data digits and said means for storing comprises a shift register having a length that is greater than said number of sequential 1 data digits.

9. The apparatus of claim 7 wherein said means for storing includes means for storing blocks of a finite number, $f$, of data digits, and said apparatus further includes;

means providing in bit position $f+1$ of the message to be encoded a bit that is a function of the parity of 0 data digits in the block to be encoded, whereby a last 0 to be encoded in a block is of said second state and all sequences of 1 data digits following a 0 data digit in said first state terminate within the data block.

10. The apparatus of claim 7 wherein said storing means comprises a serial shift register and said means for encoding includes means for encoding said data digits serially.

11. The apparatus of claim 7 wherein said first state of said first parity function identifies a state of charge of two units, where a charge unit is the charge contributed by one of the digits of a digit pair, and wherein said means for encoding comprises means encoding a 1 data digit following a 0 data digit of said first state as 01 when said second parity function is odd and as 10 when said second parity function is even.

12. The apparatus of claim 11 wherein said means for encoding data digits into waveform digit pairs comprises logic means for encoding a waveform digit pair, $a_0$, $b_0$, according to the data digit to be encoded, $d_0$, the preceding data digit $d_{-1}$, and the preceding waveform digits $a_{-1}$, $b_{-1}$, according to the following functions:

$a_0 = \overline{d_0}\,\overline{d_{-1}} + d_0\,\overline{d_{-1}}\,\overline{P(A)}\,P(B) + d_{-1}\,\overline{a_{-1}}\,\overline{b_{-1}}$ $b_0 = d_0\,[P(A)\,\overline{d_{-1}} + \overline{P(B)} + b_{-1}\,]$where P(B) is said first parity function and P(A) is said second parity function.

13. The apparatus of claim 12 including a decoder for said waveform digits including logic and storage means operating according to the following function:

$d_0 = b_0 + a_0\,\overline{a_1}\,\overline{b_1} + a_0\,a_{-1}\,\overline{b_{-1}}$ .

14. A decoder for binary digit pairs 10, 01, and 00 encoded from data bits in a relationship between the digit pair and the data digit that includes an ahead parity function and a backward parity function for avoiding digit pair sequences that increase the charge beyond three units, where a unit of charge is the charge contributed by one of the digits of a digit pair, comprising:

means for storing the digit pairs for the digit to be decoded, $d_0$, for the preceding digit, $d_{-1}$, and for the following digit, $d_1$, and means responsive to said storing means for decoding digit $d_0$.

15. The decoder of claim 14 wherein said means for decoding comprises logic means for decoding according to the following function:

$d_0 = b_0 + a_0\,\overline{a_1}\,\overline{b_1} + a_0\,a_{-1}\,\overline{b_{-1}}$ .

16. The decoder of claim 15 including means for detecting the occurrence of four consecutive 0 digits or two consecutive 1 digits in said storage means and for signalling an error.

17. The decoder of claim 16 including means for producing a first parity function of the parity of 0 digits in the decoded waveform, and means responsive to the coincidence of a predetermined value of said first parity function, the digit pair 10 for the digit to be decoded, and the digit pair 00 for the next digit to be decoded to signal an error.

18. The decoder of claim 17 including means forming a second parity function of the parity of 1 data digits in a sequence following a 0 data digit, and means responsive to the coincidence of the digit pair 00 for the next data digit to be decoded, and predetermined values for said second parity function and for said first parity function to signal an error.

19. Apparatus for encoding a data bit as a code bit pair 00, 01, or 10 according to the constraints that no adjacent 1 bits and not more than three adjacent 0 bits occur in the sequence of code bit pairs where a 1 code bit is represented by a signal transition and a 0 code bit is represented by the absence of a transition in the encoded waveform, wherein the improvement comprises, first storage means for storing a data bit to be encoded and a plurality of adjacent data bits, second storage means for storing the code bit pair for the last encoded data bit, and means responsive to said data bit, said adjacent data bits, and said code bit pair for said last encoded data bit for encoding said data bit as one of said code bit pairs in a sequence of coding states having either zero accumulated charge or the level of charge contributed by an unvarying waveform for one data digit time, at least one of said states being characterized by zero accumulation of charge and by two successor states in which either a 1 data digit or a 0 data digit may be encoded.

20. The apparatus of claim 19 wherein said coding states include two states for 0 data bits and said means for encoding includes means forming the parity of 0 data bits to produce a signal distinguishing said two states.

* * * * *